No. 634,109. Patented Oct. 3, 1899.
D. N. HITCHCOCK.
DISINFECTING DEVICE.
(Application filed Apr. 6, 1898.)

(No Model.)

Witnesses
R. T. Gray
Madge M. Flannery

Inventor
Daniel N. Hitchcock,
per J. L. Bullock and
J. W. Garner
Attorneys

UNITED STATES PATENT OFFICE.

DANIEL N. HITCHCOCK, OF MEMPHIS, TENNESSEE.

DISINFECTING DEVICE.

SPECIFICATION forming part of Letters Patent No. 634,109, dated October 3, 1899.

Application filed April 6, 1898. Serial No. 676,616. (No model.)

*To all whom it may concern:*

Be it known that I, DANIEL N. HITCHCOCK, a citizen of the United States of America, and a resident of Memphis, in the county of Shelby and State of Tennessee, have invented certain new and useful Improvements in Devices for Evaporating and Distributing Perfumes, Disinfectants, and other Volatile Liquids, of which the following is a specification.

The object of my invention is to provide a simple and inexpensive apparatus which will be effective in evaporating and distributing liquid perfumes, disinfectants, and other fluids, and also in discharging a regular supply of the same in liquid form, and which will further admit of the regulation of the quantity of the fluid consumed by evaporation and discharge in liquid form at will.

To these ends my invention consists in the combination, with an exterior casing, of an interior removable reservoir, a removable pan at the end thereof, an evaporating-wick adjustable on the exterior of the reservoir, and a siphon-wick and supporting-tubes and devices therefor adapted to discharge fluid from the pan and to regulate the discharge thereof, as will be more fully set forth hereinafter, and particularly pointed out in the claims.

Figure 1:
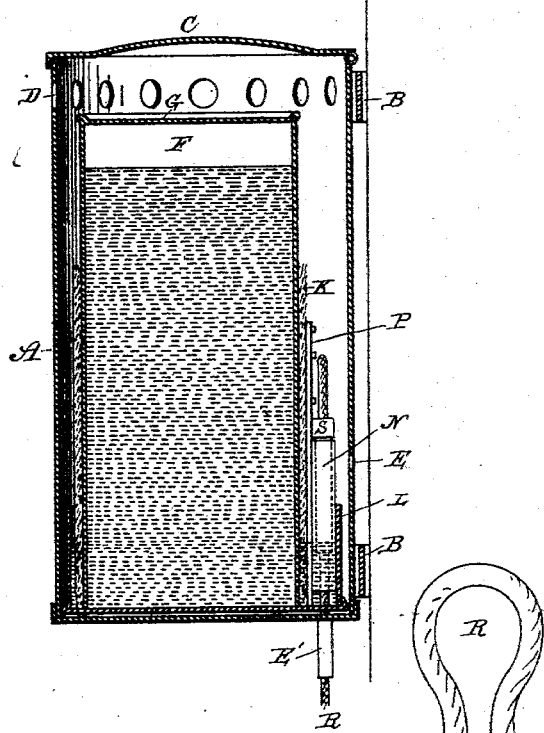
Figure 2:
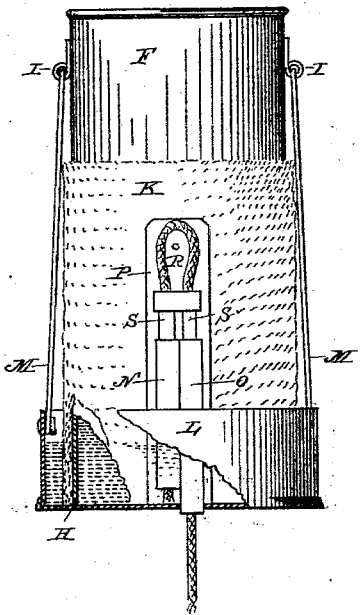
Figure 3:
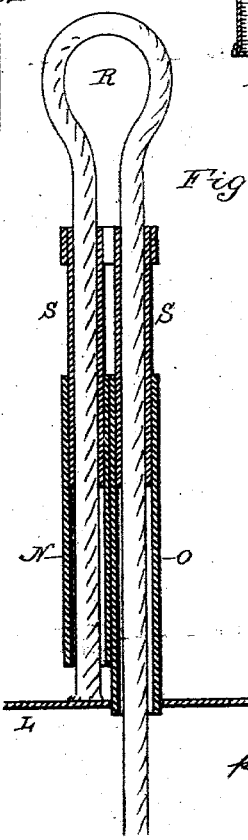

In the accompanying drawings, which illustrate my invention, Figure 1 is a sectional view of a perfume and disinfectant distributing apparatus embodying my improvements. Fig. 2 is a detailed sectional view of the reservoir, the pan, and the siphon-wick and its devices. Fig. 3 is a detailed sectional view of the adjustable siphon-tubes.

The outer casing A is preferably of cylindrical form, has brackets B on one side, by means of which it may be secured to a wall or other suitable object in an upright position, and is provided with a hinged top C. A series of open rings D are made in the said casing near its upper edge, and a number of openings E are also made in the casing on one side thereof at a suitable distance from its bottom. A tube E of suitable length and diameter projects from the bottom of the casing.

F represents the reservoir, which is preferably of cylindrical form and has its upper end closed, as at G, and its lower end open, a slight opening H being made in its lower edge at one side. A pair of eyes I are on the sides of the cylinder near its top, and an evaporating-wick K is placed on the outside of the said cylinder or reservoir and is movable thereon.

A pan L is placed under the bottom of the reservoir and is of suitable depth and of a diameter somewhat exceeding that of the reservoir, and pivoted or otherwise suitably attached to the sides of the pan are a pair of hooks or hook-arms M, which are adapted to engage the eyes I on the reservoir, and thereby secure the pan thereto.

A pair of tubes N O are arranged vertically in the pan at one side thereof and secured thereto, the lower end of the tube N being at a slight distance above the bottom of the pan and the lower end of the tube O extending through the bottom of the pan, as shown, and adapted to register with the upper end of the tube E', which depends from the casing. A standard or plate P of suitable height and width projects upward from the bottom of the pan on the inner sides of the tubes N O, and a siphon-wick R extends through the said tubes, one end of the said wick being located at or about the bottom of the pan, and the other end thereof projecting below the pan and into the tube E' in such a position as to supply drops of fluid to the said tube. A pair of tubes S are adjustable telescopically in the tubes N O and serve to support the siphon-wick at any desired adjustment.

To charge the apparatus, the reservoir and the pan are removed from the casing, the pan detached from the reservoir, and the latter upturned and filled with the perfume or disinfecting fluid. The pan is then secured on the open end of the reservoir by the hooks and eyes, and the reservoir is then quickly inverted and placed, together with the pan, in the casing in the position shown. A portion of the fluid will escape from the casing into the pan, partially filling the latter, and the said fluid will be maintained in the said pan while the reservoir is charged at the same level at all times by atmospheric pressure, as will be readily understood. The lower end of the wick K being partially immersed in the fluid will absorb the latter by capillary action and will diffuse the same by evaporation, the openings in the casing admitting of the free passage of air therethrough. The wick being movable vertically on the reservoir may be so adjusted with relation to the column of fluid in the pan as to diffuse more or less of it by evaporation, as may be desired. The inner end of the siphon-wick being also immersed in the column of fluid in the pan the said siphon-wick becomes charged with fluid by capillary action and will supply the fluid drop by drop to the tube E, which may be of such length as may be necessary to convey the fluid to any desired place or receptacle which it is desired to disinfect or perfume. By adjusting the siphon-wick in the tubes N O the action of the siphon may be increased or diminished at will, so as to regulate the quantity of fluid discharged from the reservoir.

Having thus described my invention, I claim—

1. The combination with the exterior casing of the interior removable reservoir, the removable pan at the lower end thereof, the evaporating-wick on the exterior of the reservoir, and the siphon-wick and telescoping supporting-tubes, all combined and arranged to operate, substantially as described.

2. The combination in apparatus for evaporating and distributing perfumes, disinfectants and other liquids, of the exterior casing, the pan adapted to be located in the lower end thereof, and having the tubes N, O, substantially as described; said tubes being adapted for the reception of a siphon-wick; the reservoir, having one end closed and one end open, and adapted exteriorly for the evaporating-wick and devices, substantially as set forth, to secure the open end of the reservoir in the pan, all arranged and combined to operate, substantially as described.

3. In apparatus for evaporating and distributing perfumes, disinfectants and other liquids, the combination of the pan or receptacle L, and the telescoping tubes and siphon-wick, for the purpose set forth, substantially as described.

In testimony that I claim the foregoing I hereunto affix my signature in the presence of two subscribing witnesses.

DANIEL N. HITCHCOCK.

Witnesses:
SAM WOLF,
JOHN LEVY.